US010521273B2

(12) United States Patent
Mullender et al.

(10) Patent No.: US 10,521,273 B2
(45) Date of Patent: Dec. 31, 2019

(54) PHYSICAL PARTITIONING OF COMPUTING RESOURCES FOR SERVER VIRTUALIZATION (71) Applicant: Cisco Technology, Inc., San Jose, CA (US)

(72) Inventors: Sape Mullender, Amsterdam (NL); David Richard Barach, Mount Dora, FL (US); Jim McKie, Murray Hill, NJ (US); Peter Bosch, Aalsmeer (NL)

(73) Assignee: CISCO TECHNOLOGY, INC., San Jose, CA (US)

( * ) Notice: Subject to any disclaimer, the term of this patent is extended or adjusted under 35 U.S.C. 154(b) by 197 days.

(21) Appl. No.: 15/617,190

(22) Filed: Jun. 8, 2017

(65) Prior Publication Data
US 2018/0357108 A1 Dec. 13, 2018

(51) Int. Cl.
G06F 9/50 (2006.01)
G06F 3/06 (2006.01)
(Continued)

(52) U.S. Cl.
CPC .......... *G06F 9/5077* (2013.01); *G06F 3/067* (2013.01); *G06F 3/0613* (2013.01);
(Continued)

(58) Field of Classification Search
CPC ......... G06F 15/177; G06F 2009/45579; G06F 2009/45583; G06F 3/0613; G06F 3/0644;
(Continued)

(56) References Cited

U.S. PATENT DOCUMENTS 7,865,762 B2 * 1/2011 Swanson ............. G06F 11/0712
714/2
8,286,195 B2 * 10/2012 Finger ..................... G06F 9/485
719/327
(Continued)

FOREIGN PATENT DOCUMENTS

EP 3086228 A1 10/2016
WO 2016037504 3/2016

OTHER PUBLICATIONS

International Search Report and Written Opinion from the International Searching Authority, dated Sep. 6, 2018, 13 pages, for corresponding International Patent Application No. PCT/US2018/036596.

*Primary Examiner* — Idriss N Alrobaye
*Assistant Examiner* — Richard B Franklin
(74) *Attorney, Agent, or Firm* — Polsinelli PC (57) ABSTRACT A baseboard management controller (BMC) can physically partition the computing resources of a physical host into different resource groups for concurrently running a different operating system per resource group. The BMC can allocate a first processor of the host to a first resource group and a second processor of the host to a second resource group. The BMC can separate the memory of the host into a first memory range for the first processor and a second memory range for the second processor, and the BMC can limit access to the first memory range to the first processor and limit access to the second memory range to the second processor. The BMC can also distribute physical or virtual peripheral devices of the host between the first processor and the second processor.

20 Claims, 6 Drawing Sheets (51) Int. Cl.
*G06F 9/4401* (2018.01)
*G06F 9/455* (2018.01)

(52) U.S. Cl.
CPC .......... *G06F 3/0644* (2013.01); *G06F 3/0664* (2013.01); *G06F 9/4406* (2013.01); *G06F 9/4411* (2013.01); *G06F 9/45558* (2013.01); *G06F 2009/45579* (2013.01); *G06F 2009/45583* (2013.01)

(58) Field of Classification Search
CPC ...... G06F 3/0664; G06F 3/067; G06F 9/4406; G06F 9/4411; G06F 9/45558; G06F 9/5077
See application file for complete search history.

(56) References Cited

U.S. PATENT DOCUMENTS

| | | | |
|---|---|---|---|
| 8,694,991 B2 | 4/2014 | Bonola et al. | |
| 8,893,147 B2* | 11/2014 | Yin | G06F 9/45558 718/105 |
| 8,978,031 B2* | 3/2015 | Kamble | G06F 9/45558 718/1 |
| 9,021,472 B2 | 4/2015 | Bealkowski | |
| 9,400,671 B2 | 7/2016 | Chuang et al. | |
| 9,459,928 B2* | 10/2016 | Bonola | G06F 9/5077 |
| 9,639,486 B2 | 5/2017 | Imada et al. | |
| 9,703,726 B2* | 7/2017 | Lutas | G06F 12/145 |
| 10,180,843 B2* | 1/2019 | Lu | G06F 9/4405 |
| 2007/0226795 A1* | 9/2007 | Conti | G06F 21/554 726/22 |
| 2015/0277763 A1 | 10/2015 | Zhou et al. | |
| 2016/0014039 A1 | 1/2016 | Reddy et al. | |
| 2017/0206110 A1* | 7/2017 | Huang | G06F 9/45558 |

\* cited by examiner

PHYSICAL PARTITIONING OF COMPUTING RESOURCES FOR SERVER VIRTUALIZATION

TECHNICAL FIELD

The subject matter of this disclosure relates in general to the field of server virtualization, and more specifically to techniques for physically partitioning resources of a computing system via a baseboard management controller of the system.

BACKGROUND

Virtualization is an important technology used in a modern data center. Virtualization can allow an operator of the data center to consolidate workloads; raise utilization levels; reduce operating, capital, space, power, and cooling expenses; move workloads dynamically within a virtualization pool to increase the flexibility to take servers offline or bring new ones online; manage the relationship of virtual instances to physical machines to optimize performance and maintain service levels; scale existing applications or deploy new ones by creating more virtual instances using an existing pool of resources; and deploy high-availability and disaster-recovery features of a virtualization platform to overcome localized and geographic failures, among other benefits.

Two common approaches to virtualizing a data center are hypervisor-based virtualization and container-based virtualization. In hypervisor-based virtualization, software emulates the hardware of a physical computer so that an entire, unmodified operating system can run with the emulated or virtual environment (i.e., a virtual machine (VM)). A single physical server can run several VMs at once, and a hypervisor or virtual machine monitor (VMM) can manage the VMs and allocate the resources of the server among them. Hypervisor-based virtualization, however, can introduce additional overhead because a server implementing this approach must replicate true hardware behaviors for each VM running on the server. Containers do not require an additional layer of virtual hardware. Instead, a system implementing containers attempts to provide self-contained execution environments by isolating applications that rely on the same kernel. Thus, containers within a server all run on a single operating system kernel, and that kernel must be capable of supporting all applications and software running within the containers. Container-based virtualization therefore typically does not allow a server to run different operating systems or different versions of the same operating system.

DESCRIPTION OF EXAMPLE EMBODIMENTS

Overview

Systems and methods in accordance with various embodiments of the present disclosure may overcome one or more of the foregoing or other deficiencies experienced in conventional approaches for hypervisor-based and container-based virtualization. A baseboard management controller (BMC) can physically partition the computing resources (e.g., processing, memory, input/output (I/O), and/or storage) of a server into two or more resource groups for concurrently running a different operating system and one or more applications per resource group. For example, the BMC can allocate at least a first processor (e.g., a pair of processors of a four-socket server, a multi-core processor, a single core of a multi-core processor, etc.) of a physical host to a first resource group and a second processor of the physical host to a second resource group. The BMC can load one or more boot images (e.g., basic input/output system (BIOS), Unified Extensible Firmware Interface (UEFI) boot manager, boot loader, bootstrap, or other software/firmware executed prior to loading of an operating system) and/or other configuration data from a storage area network (SAN) (or other remote storage) or a storage device embedded on the physical host (e.g., read-only memory (ROM), flash memory, or other non-volatile memory) for initializing the hardware of the physical host.

In some embodiments, the BMC/boot image(s) can partition the memory of the physical host into at least a first memory range for exclusive use by the first processor and a second memory range for exclusive use by the second processor. For example, the first memory range can comprise a first set of (one or more) dual in-line memory modules (DIMMs) mounted on the physical host and the second memory range can comprise a second set of (one or more) DIMMs mounted on the physical host. The BMC/boot image(s) can generate a first memory map that maps the first memory range to the first set of DIMMs and a second memory map that maps the second memory range to the second set of DIMMs. Alternatively or in addition, the BMC/boot image(s) can limit access to the memory controller(s) of the first set of DIMMs to the first processor and limit access to the memory controller(s) of the second set of DIMMs to the second processor.

In some embodiments, the BMC/boot image(s) can also distribute physical or virtual peripheral devices of the physical host between the first processor and the second processor. For example, the BMC/boot image(s) can expose/hide one or more I/O ports from one of the resources groups. Alternatively or in addition, the BMC/boot image(s) can generate a Peripheral Component Interconnect Express (PCIe) address memory map for one of the resource groups that gives that resource group access to a particular peripheral device and denies access to a different peripheral device. Alternatively or in addition, the BMC/boot image(s) can configure a peripheral device to be a bus master, and that peripheral device can act on I/O requests from a particular processor and ignore I/O requests from a different processor.

Description

Figure 1:
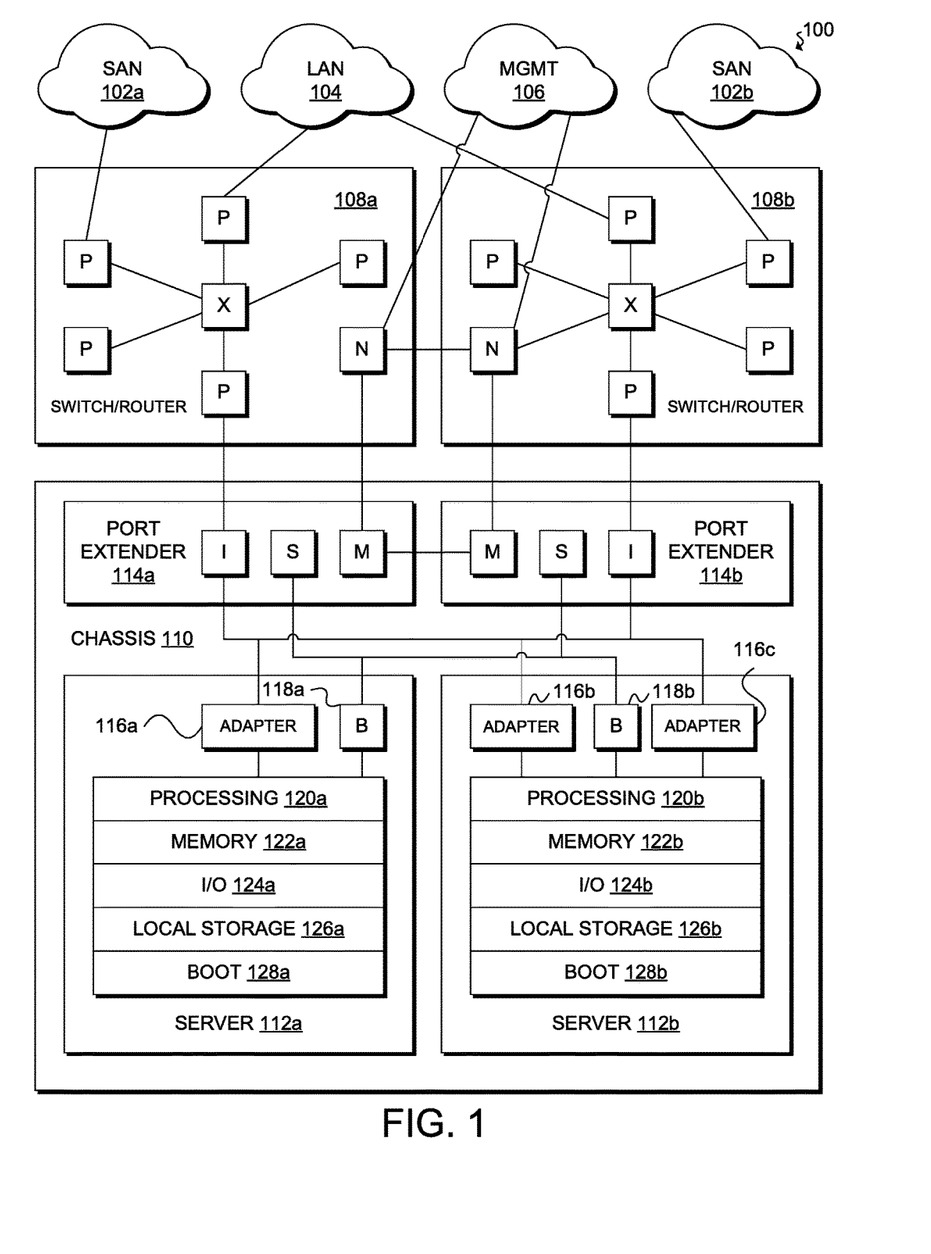
FIG. 1 illustrates an example of a network environment in accordance with an embodiment.

FIG. 1 illustrates an example of a network environment 100 in accordance with an embodiment. One of ordinary skill in the art will understand that, for the network environment 100 and any system discussed in the present disclosure, there can be additional or fewer nodes, devices, links, networks, or components in similar or alternative configurations. Various embodiments may include different numbers and/or types of clients, networks, nodes, cloud components, servers, software components, devices, virtual or physical resources, configurations, topologies, services, appliances, deployments, network devices, etc. The illustrations and examples provided in the present disclosure are for conciseness and clarity.

In this example, the network environment 100 includes storage area networks (SAN) 102a and 102b (collectively, "102"), local area network (LAN) 104, management network 106, network devices 108a and 108b (collectively, "108"), and server chassis 110. Server chassis 110 is a computing infrastructure device used to interconnect servers in various form factors (e.g., rack servers, blade servers, and other high-density servers) with other network elements. Server chassis 110 can provide power, cooling, connectivity, and mechanical support for servers, such as servers 112a and 112b (collectively, "112") and network devices, such as switches, routers, network appliances (e.g., load balancers, deep packet inspectors, firewalls, etc.), port extenders (e.g., port extenders 114a and 114b (collectively, "114")), etc. An example of an implementation of server chassis 110 is Cisco Unified Computing System™ (Cisco UCS®) Blade Server Chassis, provided by Cisco Systems®, Inc. of San Jose, Calif. Server chassis 110 includes a number of slots (e.g., 8 half-width slots, 4 full-width slots, or other capacities) for receiving servers 112. Server chassis 110 can reduce the number of physical components and the amount of cabling relative to conventional rack or blade systems, integrate with existing infrastructure for centralized management, and operate more efficiently with respect to energy consumption than conventional systems.

In FIG. 1, server 112a is a half-width or half-slot server and server 112b is a full-width or full-slot server. Other embodiments may utilize servers having other types of form factors, including some embodiments with servers that do not require a chassis. For example, various embodiments can include a server that is a standalone device communicatively coupled to server chassis 110 or to one or more network devices 108. Various types of interconnections and buses can provide the communicative coupling, including any wired or wireless interconnection line, network, connection, bundle, single bus, multiple buses, crossbar network, single-stage network, multi-stage network, or other conduction medium operable to carry data between parts of a computing device or between computing devices.

Half-slot server 112a includes network adapter 116a, baseboard management controller (BMC) 118a, processing subsystem 120a, memory subsystem 122a, I/O subsystem 124a, local storage subsystem 126a, and boot subsystem 128a. Network adapter 116a (e.g., a network interface controller or card (NIC), network adapter, LAN adapter, etc.) connects server 112a to other physically separate and discrete network elements (e.g., network adapters 116b and 116c, port extenders 114, network devices 108, SANs 102, LAN 104, management network 106, etc.) and logically separate elements of server 112a (e.g., virtual machines, containers, or other partitions). A person of ordinary skill will appreciate that some of these elements are combinable (e.g., an I/O subsystem typically includes a network interface) or further divisible (e.g., cache memory is distinguishable from main memory) but server 112a includes the above subsystems for purposes of simplicity and clearness.

BMC 118a monitors and manages the physical state of server 112a. BMC 118a includes a specialized service processor (not shown) and firmware (not shown) to provide management and monitoring capabilities independently from processing subsystem 120a. BMC 118a is reachable even when processing subsystem 120a is powered off or non-operational. In some embodiments, BMC 118a supports the standards defined in the Intelligent Platform Management Interface (IPMI) specification. An example of an implementation of BMC 118a is the Cisco® Integrated Management Controller (CIMC). CIMC is compliant with the IPMI specification but also provides additional functionality for providing unified monitoring and management of multiple computing systems. Diagnostic and health monitoring features provided with CIMC include support for Simple Network Management Protocol (SNMP); extensible mark-up language (XML) application programming interface (API) event subscription and configurable alerts; system event logging; audit logging; monitoring of field-replaceable units (FRUs), hard disk drive (HDD) faults, dual inline memory module (DIMM) faults, NIC media access control (MAC) address, CPU, and thermal faults; configurable alerts and thresholds; watchdog timer; redundant array of independent disks (RAID) configuration and monitoring; predictive failure analysis of HDD and DIMM; support for converged network adapters (CNAs); and support for Network Time Protocol (NTP).

In some embodiments, CIMC can operate in a standalone mode to provide users with full control of the server, allowing an administrator to perform server management tasks including powering on, powering off, power-cycling, resetting, and shutting down the server; toggling the locator light-emitting diode (LED); configuring the server boot order; viewing server properties and sensors; configuring out-of-band storage; managing remote presence; managing firmware; creating and managing local user accounts and enabling authentication through Active Directory and Lightweight Directory Access Protocol (LDAP); configuring network-related settings, including NIC properties, Internet Protocol (IP) version 4 (IPv4), IP version 6 (IPv6), virtual local area networks (VLANs), and network security; configure communication services, including Hypertext Transfer Protocol (HTTP), secure shell (SSH), and IPMI over LAN; managing certificates; configuring platform event filters; and monitoring faults, alarms, and server status.

In some embodiments, CIMC may also provide features such as a hypertext mark-up language version 5 (HTML5) and keyboard, video, and mouse (KVM) user interface (UI); Redfish support; and XML API transactional support. HTML5 and KVM can provide users with a simplified UI, and can eliminate the need for Java to use CIMC. Redfish is an open industry standard specification and schema that specifies a restful stateful transfer (REST) interface and uses Javascript Object Notation (JSON) and Open Data Protocol (OData) to help customers integrate solutions within their existing tool chains. XML API transactional support enables configuration of multiple managed objects in a single transaction, allowing for quicker, simpler deployments.

In some embodiments, BMC 118a can perform configuration and management services while server 112a is in a low-power state, such as a standby state. In contrast, processing subsystem 120a, memory subsystem 122a, local storage subsystem 126a, etc., may require server 112a to be in a relatively high power state. In general, a low-power state may include a state where server 112a is not completely powered on and does not provide all or substantially all of its full functionality, whereas a high-power state is a state where server 112a is powered on and provides all or substantially all of its capabilities, less capabilities that are specifically disabled for purposes of management and configuration.

Processing subsystem 120a connects to other elements of server 112a via one or more interconnects or buses, and can directly perform instructions stored in memory subsystem 122a and indirectly perform instructions stored in local storage subsystem 126a, SANs 102, and/or other memory locations. Processing subsystem 120a can include any combination of hardware, software, and/or firmware providing programmable logic. Examples of implementations of processing subsystem 120a include the Advanced RISC Machine (ARM) architecture provided by ARM Holdings plc of Cambridge, England, United Kingdom; the Microprocessor without Interlocked Pipeline Stages (MIPS) architecture provided by MIPS Technologies, Inc. of Sunnyvale, Calif.; the Power architecture provided by IBM of Armonk, North Castle, N.Y.; the Scalable Processor Architecture (SPARC) provided by Sun Microsystems of Menlo Park, Calif.; and the x86 architecture provided by Intel Corp. of Santa Clara, Calif., Advanced Micro Devices (AMD), Inc. of Sunnyvale, Calif., or VIA Technologies Inc. of New Taipei City, Taiwan, Republic of China.

Memory subsystem 122a comprises a collection of random access memories (RAMs), integrated circuits (ICs) that generally allow for access to data stored in the ICs in any order, in constant time, regardless of the data's physical location. RAMs can include static RAMs (SRAMs); dynamic RAMs (DRAMs); and synchronous DRAMs (SDRAMs). SRAMs are generally very fast but typically have a smaller capacity (e.g., a few megabytes) than DRAMs. SRAMs are static because they have a chip structure that maintains data as long as there is power to the SRAMs. However, SRAMs are generally not large enough to operate as the main memory of a server. Instead, main memory typically comprises DRAMs. DRAMs store data on capacitors within an integrated circuit. DRAMs are dynamic because capacitors can discharge over time due to leakage currents and may require recharging to avoid data loss.

SDRAMs have a synchronous interface, meaning that their operation synchronizes with a clock signal. The clock can drive an internal finite state machine that "pipelines" memory accesses (i.e., SDRAM can accept a new memory access before it has finished processing the previous one). Pipelining can improve the performance of SDRAMs relative to conventional DRAMs. The first implementation of SDRAM, single data rate (SDR), specified transfer of a single unit of data per clock cycle. The next implementation of SDRAM, double data rate (DDR), could achieve nearly twice the bandwidth of SDR by transferring data on the rising and falling edges of a clock signal, without increasing clock frequency. DDR evolved into second generation DDR (DDR2) and third generation DDR (DDR3). DDR2 is capable of operating the external data bus at twice the data rate of DDR by improved bus signaling. DDR3 improves upon DDR2 by reducing operating voltage, increasing memory density, and increasing memory bandwidth.

In some embodiments, memory subsystem 122a can include multiple memory chips assembled together on small boards known as dual inline memory modules (DIMMs). A DIMM can have a rank, an arrangement of chips that produce a specified number of bits of useful data (e.g., 64, 128, etc.). Thus, a DIMM can be single-rank, double-rank, quad-rank, etc. A memory controller can select a memory rank by chip select instead of by address bits. A typical memory controller can include up to eight separate chip selects and are therefore capable of supporting up to eight ranks.

SDRAM DIMMs can include unbuffered DIMMs (UDIMMs) and registered DIMMs (RDIMMs). In UDIMMs, the memory chips directly connect to the address and control buses, without any intermediate component. RDIMMs have additional components, registers, placed between the incoming address and control buses and the SDRAM components. These registers can add one clock cycle of delay but can reduce the electrical load on the memory controller and allow more DIMMs per memory controller.

I/O subsystem 124a includes peripheral devices (other than network adapter 116a) and the interfaces for connecting the peripheral devices to server 112a. I/O subsystem 124a is generally responsible for moving data from memory subsystem 122a to accessible peripheral devices and vice versa. Historically, computing systems provided I/O using buses compatible with the Peripheral Component Interconnect (PCI) standard, a standard developed to interconnect peripheral devices to a computing system. Various embodiments support a version of PCI, PCI Express (PCIe). PCIe specifies point-to-point connectivity resulting in a tree structure topology with a single root complex. The root complex can be responsible for system configuration, enumeration of PCIe resources, and management of interrupts and errors for the PCIe tree. A root complex and its endpoints can share a single address space and communicate through memory reads and writes, and interrupts. PCIe connects two components with a point-to-point link. Links comprise N lanes (i.e., a by-N link comprises N lanes), and each lane can include two pairs of wires: one pair for transmission and one pair for reception. Each lane connects to a PCIe endpoint, PCIe switch, or a PCIe to PCI bridge.

Local storage subsystem 126a comprises non-volatile memory and can be a hard disk drive (HDD), solid state device (SSD), or other type of computer readable media which can store data that is accessible by a computing system, such as Universal Serial Bus (USB) flash memory drives, flash memory cards or sticks, optical disks, magnetic tape, standalone RAM disks, read only memory (ROM), and hybrids thereof.

Boot subsystem 128a includes software and/or firmware for performing hardware initialization upon server 112a powering on or booting up, and to provide runtime services for operating systems and applications. Boot subsystem 128a may initialize and test the hardware components of server 112a. Boot subsystem 128a can also load one or more operating systems from local storage subsystem 126a or SANs 102 into memory subsystem 122a. In addition, boot subsystem 128a can discover and setup one or more peripheral devices for access by processing subsystem 120a. In some embodiments, server 112a may store boot subsystem 128a as one or more boot images in a peripheral memory device connected to server 112a. Alternatively or in addition, SANs 102 may store one or more boot images from which server 112a can retrieve the boot image(s). Multiple boot images can represent different hardware, software (e.g., operating systems, applications, etc.), and/or firmware configurations for server 112a. Examples of implementations of boot subsystem 128a include basic input/output system (BIOS) for the x86 architecture or the Unified Extensible Firmware Interface (UEFI) or a bootloader for the ARM architecture.

In some embodiments, BMC 118a may program and/or execute boot subsystem 128a to configure two physical Ethernet links to combine them into one double-capacity Ethernet interface that can mask link failures (at the cost of halving capacity); configure an Ethernet link to split it into an out-of-band management Ethernet interface with its own MAC address for exclusive use by BMC 118a and one or more in-band Ethernet interfaces with different MAC addresses; configure a group of disks to organize them as a RAID configuration to form one or more fault-tolerant disks; configure PCIe devices to expose them or hide them from one or more operating systems of server 112a; and monitor and manage power supplies, voltages, clocks, CPU speed, temperatures, and fans.

In some embodiments, BMC 118a may also program and/or execute boot subsystem 128a to configure memory controllers to limit access to certain portions or ranges of memory subsystem 122a to certain processors of processing subsystem 120a. For example, server 112a may include multiple memory controllers and multiple processors (e.g., multiple sockets and/or multiple cores per processor). BMC 118a may program and/or execute boot subsystem 128a to limit the access of certain processors to particular sections of memory to effectively partition the memory among the processors. Alternatively or in addition, BMC 118a can program and/or execute boot subsystem 128a to limit the access of certain cores to specific portions of memory and control whether the cores can interrupt one another. In some embodiments, BMC 118a may also program and/or execute boot subsystem 128a to control whether certain virtual or physical peripheral devices are accessible to specific processors or cores. In some embodiments, BMC 118a can load different boot images for each partition of processors and/or cores and thereby each partition can bootstrap independently. In this manner, BMC 118a can create a number of segregated resource groups with each group comprising one or more processors or cores, a memory range, and one or more accessible peripheral devices (and/or a PCIe address range). Thus, BMC 118a can perform operations similar to a conventional hypervisor without the overhead that may come with operating a host operating system and a guest operating system. This approach is also an improvement upon containerization because server 112a is no longer limited to a single operating system.

Full-slot server 112b includes network adapters 116b and 116c, BMC 118b, processing subsystem 120b, memory subsystem 122b, I/O subsystem 124b, local storage subsystem 126b, and boot subsystem 128b. One of ordinary skill in the art will appreciate that full-slot server is in many respects similar to full-slot server 112b. However, full-slot server 112b includes more overall resources than half-slot server 112a. For example, full-slot server 112b can include more processors (and/or cores), more DIMMs, and more I/O interfaces (including network interfaces), thus providing greater processing power, memory, and networking capabilities relative to half-slot server 112a.

Servers 112 connect to port extender 114 via network adapters 116a and 116b. A port extender, standardized by the Institute of Electrical and Electronics Engineers (IEEE) 802.1Qbh protocol, can operate as an access device for use in NICs, blade switches, top-of-rack (TOR) switches, hypervisors, single root I/O virtualization (SR-IOV) adapters, virtual switches, etc. A port extender can attach to a MAC port of an 802.1Q bridge (i.e., a controlling bridge) to provide additional MAC ports (downlink interfaces) that are logical ports of the 802.1Q bridge to which the port extender attaches. Packets can flow from a port extender through the controlling bridge to allow consistent forwarding and policy enforcement for traffic. The controlling bridge can operate as a logically centralized management point for its collection of port extenders. Examples of implementations of port extenders 114 include Cisco® Fabric Extender (FEX) Technology, such as the Cisco Nexus® Fabric Extenders (FEX) for providing additional ports for TOR switches, Cisco UCS® Fabric Extenders for providing additional ports for the Cisco UCS® Blade Server Chassis, Cisco® Adapter Fabric Extender (Adapter FEX) for providing additional ports for a server, and the Cisco® Data Center Virtual Machine Fabric Extender (VM-FEX) for providing additional ports for virtual machines.

Port extenders 114 can each include interconnect infrastructure I, chassis manager M, and chassis management switch S. Interconnect infrastructure I can operate as a bridge between servers 112 and switch/routers 108 and implement the data plane of the port extenders 114. Examples of implementations of interconnect infrastructure I are Cisco® FEX ASICs, such as Redwood and Woodside. Chassis manager M can interact with network-wide manager N in switch/routers 108 and BMC 118 in servers 112. Chassis manager M can perform server discovery and sequencing, power management, temperature monitoring, and fan control looping. In some embodiments, when there are multiple port extenders 114 in server chassis 110, as in the example of FIG. 1, chassis managers M may form a cluster with one manager in an active state and another in an inactive state according to a high-availability algorithm. For example, there can be a serial interface between chassis managers M for receiving heartbeats between the two managers. Failover can occur either by failure to detect a heartbeat or unplugging of the active chassis manager. Network-manager N may also force a fail-over. Examples of implementations of chassis managers M include Cisco® Chassis Management Controller (CMC) ASICs. Chassis manager switch S can provide connectivity to BMC 118 present on each server 112. Examples of implementations of chassis manager switch S include Cisco® Chassis Management Switch (CMS) ASICs.

Port extenders 114 connect server chassis 110 to switches/routers 108a and 108b (collectively, "108"). Switches/routers 108 can operate as spine switches in a spine-and-leaf topology; aggregation/distribution switches and/or core switches in three-tier, multi-tier, or fat tree topologies; a Level 1+ switch in a BCube network topology; or other switch/router in a suitable network topology (e.g., DCell, CamCube, FiConn, Jelly fish, Scafida, etc.). Examples of implementations of switch/routers 108 include Cisco UCS® Fabric Interconnects, Cisco Catalyst® switches, Cisco Nexus® switches, Cisco® Industrial Ethernet switches, Cisco Meraki™ or Meraki® switches/routers, Cisco® Integrated Services Routers (ISR), Cisco® Network Convergence System (NCS) routers, Cisco® Aggregation Services Routers (ASR), Cisco® Industrial ISR, and Cisco® Connected Grid Routers, among others.

Switches/routers 108 include port controller ASICs P, crossbar fabric ASIC X, and network-wide manager N. Port controller ASICs P control a small group of ports (e.g., 4, 8, 16, etc.) for processing packets upon egress or egress for managed ports. Port controller ASICs P can also handle forwarding decisions between ports. Examples of implementations of port controller ASICs P include Cisco® Unified Port Controller (UPC) ASICs.

Crossbar fabric ASIC X operates as a bridge between port controllers P, and can manage packet switching and scheduling. That is, crossbar fabric ASIC X can couple a port controller for an ingress port to the port controller for an egress port to enable traffic flow between the ports. Examples of implementations of crossbar fabric ASIC X include Cisco® Unified Crossbar Fabric (UCF) ASICs.

Network-wide manager N can include hardware, software, and/or firmware for monitoring and managing server, network, and storage infrastructure of network environment 100. Network-wide manager N can provision server, fabric, and storage resources as well as perform device discovery, inventory, configuration, diagnostics, monitoring, fault detection, auditing, and statistics collection. For example, network-wide manager N can automatically detect, inventory, manage, and provision system components added to or changed in network environment 100. Network-wide manager N can also manage clustering, switch redundancy, and otherwise ensure high availability for server, network, and storage resources in a data center and/or a remote network or cloud. Examples of implementations of network-wide manager N include Cisco UCS® Central, Cisco UCS® Director, Cisco UCS® Manager, Cisco UCS® Performance Manager, Cisco® IMC Supervisor, Cisco® Application Policy Infrastructure Controller (APIC), Cisco ONE™ Enterprise Cloud, Cisco® Intelligent Automation, Cisco® Intercloud Fabric, Cisco® Network Services Data Center Network Manager, Cisco Prime® Network Services Controller, or other system for monitoring and managing multiple servers, the network fabric, and/or server storage.

Switches/routers 108 can support various types of traffic and include various types of ports and port controllers for connecting servers 112 to other networks, such as SANs 102, LAN 104, management network 106, or any communicative platform operable to exchange data or information within or between computing systems (e.g., Internet, ad-hoc local network, packet data network (PDN), LAN, metropolitan area network (MAN), wide area network (WAN), wireless local area network (WLAN), virtual private network (VPN), intranet, or any other appropriate architecture or system that facilitates electronic communications). For example, switches/routers 108 can include a number of 40 Gbps (Quad Small Form-Factor Pluggable) (QSFP) or QSFP+ ports that can operate at native-40-Gbps speed, or that can operate as four 10-Gbps ports (e.g., by inserting a QSFP-to-4 small form factor plus pluggable (SFP+) breakout cable) for handling Ethernet/IP traffic (e.g., traffic to/from LAN 104), Fibre Channel (FC) or Fibre Channel on Ethernet (FCoE) ports for handling block storage traffic (e.g., traffic to/from SANs 102), and serial ports for handling management traffic (e.g., traffic to/from management network 106) and inter-process communications (IPC) (e.g., high availability, clustering, virtualization platform services, etc.).

Figure 2A:
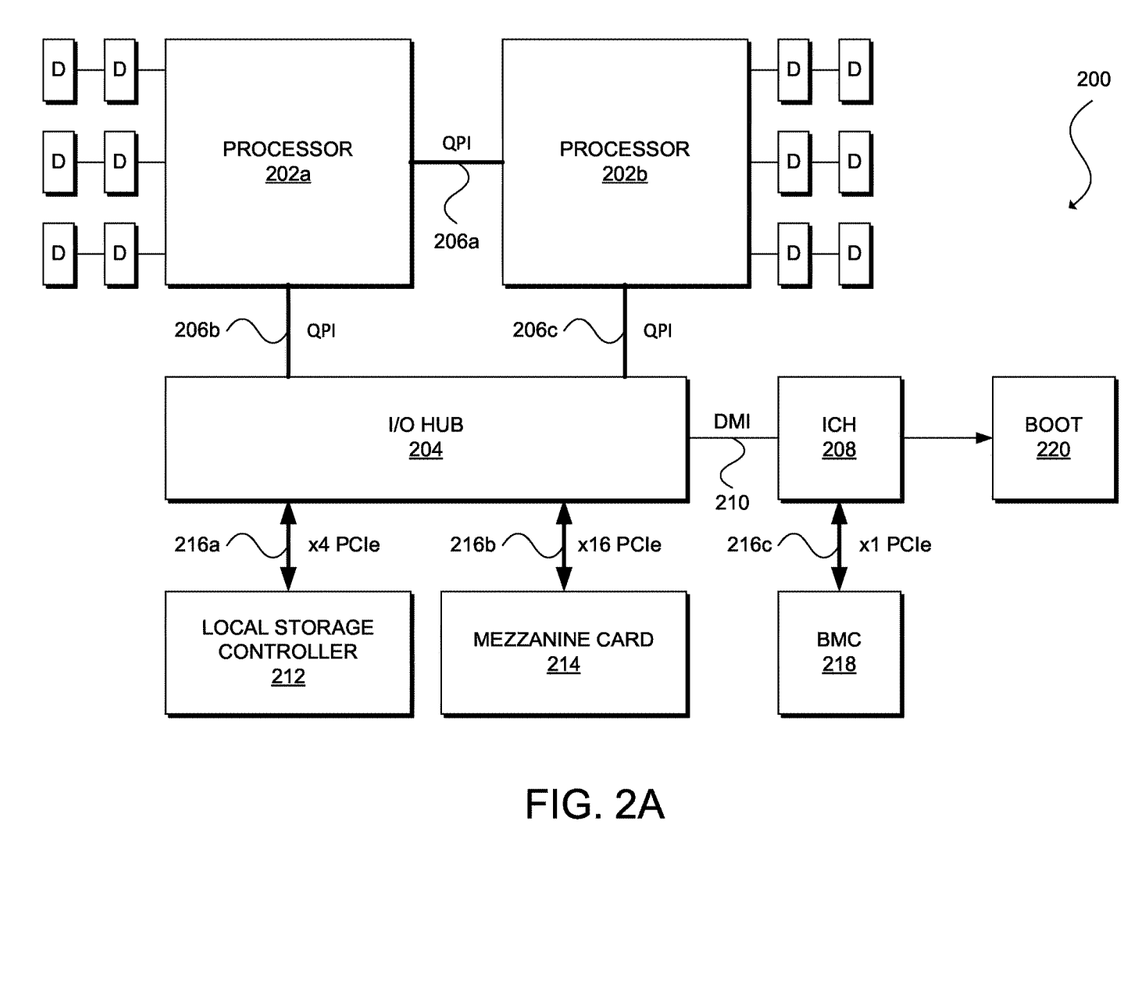
FIG. 2A and FIG. 2B illustrate examples of computing systems in accordance with some embodiments.
Figure 2B:
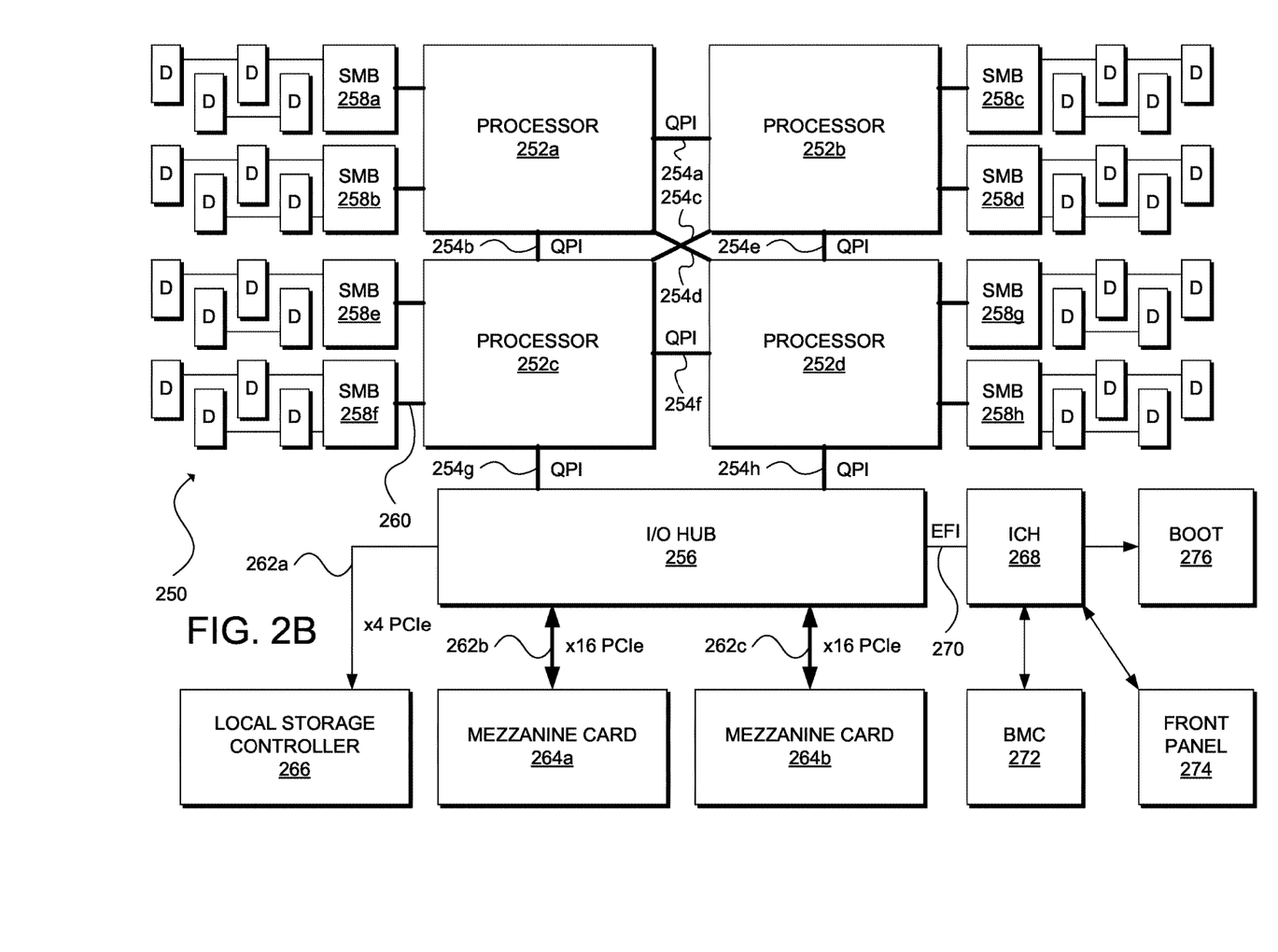

FIG. 2A and FIG. 2B illustrate computing systems 200 and 250. In some embodiments, computing systems 200 and 250 can be respective implementations of servers 112a and 112b of FIG. 1. This disclosure provides additional details regarding each of the components in FIG. 2A and FIG. 2B in more detail below. However, one skilled in art will understand that computing systems 200 and 250 are each simply one possible configuration and that other configurations with more or fewer components are also possible.

Computing system 200 is a half-slot, two-socket server including processors 202a and 202b (collectively, "202"). Sockets are mounting/interconnection structures for installing processors on a printed circuit board (PCB) or mother board of a computing system. Multiple sockets can provide for customization of a server motherboard by enabling mounting of processors using different clock speeds and/or amounts of power. Each processor 202 can include one or more cores (e.g., 2, 4, 6, 8, etc.) (not shown), each of which can replicate a basic central processing unit (CPU). Each core may be associated with a level 1 (L1) cache (not shown). Caches are small fast memories that can reduce the average time to access main memory. The cores generally share a larger level 2 (L2) or level 3 (L3) cache, a bus or interconnection interface, and external die connections. The number of processors of a computing system is the product of the number of sockets and the number of cores per socket. For example, computing system 200 includes two sockets and can include four cores per socket for a total of eight processors. An example of an implementation of processor 202a or 202b is the Xeon Processor provided by Intel Corp. of Santa Clara, Calif.

Processors 202 connect to one another and to I/O hub 204 by interconnections 206a, 206b, and 206c (collectively, "206"). In this example, processors 202 and interconnections 206 implement the QuickPath Interconnect (QPI) architecture provided by Intel. QPI utilizes multiple high-speed uni-directional links for interconnecting processors and a chipset or similar computing system element and integrating multiple distributed memory controllers for multiple cores of the processor chip. In this example, the cores inside a socket may share integrated memory controllers (IMCs) (not shown) that have multiple memory interfaces (i.e., memory buses). The IMCs may have various external connections, such as DDR3 memory (or other suitable memory) channels for connecting processors 202 to DDR3 (or other suitable memory) DIMMs D. IMCs and cores in different sockets can talk to one another using QPI. Processors implementing QPI may also have full access to the memory of every other processor while maintaining cache coherency using a cache-coherent Non-Uniform Memory Architecture (NUMA). However, various embodiments may limit the memory range each processor 202 can access as discussed further below. A computing system that implements QPI can achieve global memory reachability (or reachability by one socket to memory of another socket) using an internal crossbar router in the socket. This route-through capability may allow for computing systems without a fully connected topology. Other embodiments may implement interconnections 206 using other types of buses or interconnections, such as front-side buses (FSBs), dual independent buses (DIBs), Dedicated High-Speed Interconnect (DHSI), etc.

I/O hub 204 (sometimes referred to as a chipset) connects processors 202 to I/O controller hub (ICH) 208 using interconnection 210, local storage controller 212 using interconnection 216a, and mezzanine card 214 using interconnection 216b. An example of an implementation of I/O hub 204 is the X58 chip provided by Intel. In this example, interconnection 210 implements the Direct Media Interface (DMI) provided by Intel, and interconnections 216a and 216b are a PCIe x4 link and a PCIe x16 link, respectively.

Local storage controller 212 connects computing system 200 to local storage devices (e.g., HDD, SSD, etc.). Local storage controller 212 (sometimes referred to as a SAS controller) can support Serial Attached Small Computer System Interface (SAS) and Serial Advanced Technology Attachment (SATA) transfer rates, and integrate mirroring and striping functions to provide different RAID availability levels for internal drives. An example of an implementation of local storage controller 212 is the 1064e storage processor provided by LSI Corp. of San Jose, Calif.

Mezzanine card 214 (i.e., a network adapter) is a PCB assembly that combines the electrical characteristics of the PCI bus (e.g., IEEE P1386.1) with the mechanical characteristics of the Common Mezzanine Card (CMC) format (e.g., IEEE 1386). Mezzanine card 214 can include a number of bus connectors (not shown), such as for connecting to one or more 32-bit PCI buses, 64-bit PCI buses, or other non-specified, non-standardized, and/or proprietary I/O bus. Other card standards supported can include the PCI Mezzanine Card (PMC) eXtended (PMC-X), Processor PMC (PPMC), conduction-cooled PMC (CCPMC), Switched Mezzanine Card (XMC), or FMC-FPGA Mezzanine Card standards.

I/O controller hub 208 (sometimes referred to as a Southbridge) connects computing system 200 to relatively low-speed peripheral devices (not shown) (e.g., USB devices or other devices slower than mezzanine card 214), BMC 218, and boot subsystem 220. An example of an implementation of I/O controller hub 208 is the ICH10 I/O controller hub provided by Intel®. In this example, interconnection 216c between ICH 208 and BMC 218 is a PCIe x4 link. BMC 218 provides management access to computing system 200 prior to the loading of an operating system, and can operate as an aggregation point for server hardware. In some embodiments, BMC 218 can have two integrated Ethernet connections (not shown) connected in a redundant manner to management components of access devices (e.g., chassis management switches S). BMC 118 of FIG. 1 is an example of an implementation of BMC 218.

Boot subsystem 220 includes software or firmware for initializing hardware upon powering on or booting up computing system 200 (e.g., BIOS, UEFI, bootloader, etc.) or other management software and/or firmware executed prior to loading of one or more operating systems of computing system 200. Boot subsystem 128 is an example of an implementation of boot subsystem 220.

Computing system 250 is a full-slot, four-socket server including processors 252a, 252b, 252c, and 252d (collectively, "252"). Each processor 252 can include one or more cores (e.g., 4, 6, 8, etc.) (not shown), each of which represents a discrete processing element. In this example, each processor 252 can include 4 cores such that the CPU of computing system 250 includes a total of 16 processors. Examples of implementations of processors 252 include the Xeon 7500 series CPUs provided by Intel. Processors 252 are fully interconnected with one another using interconnections 254a, 254b, 254c, 254d, 254e, and 254f (collectively, "254"). Processors 252c and 252d also connect to I/O hub 256 using interconnections 254g and 254h, respectively. In this example, processors 252a and 252b may connect to I/O hub 256 through core-to-core QPI links. In other embodiments, processors 252a and 252b may connect to a second I/O hub symmetrical that enable such a computing system to include additional memory and/or PCIe slots. In this example, interconnections 254 are QPI links but other embodiments may utilize other types of buses or interconnections as discussed elsewhere.

Each processor 252 also connects to one or more serial memory buffers (SMBs) 258 using Serial Memory Interface (SMI) links 260. Each SMB 258 can connect to one or more DIMMs D (e.g., DDR3 DIMM). In an embodiment, a computing system can include four sockets with each socket connected to four SMBs and each SMB connected to two DIMMs providing a total of 32 DIMMs.

Interconnections 262b and 262c (collectively, "262") are the two main I/O paths toward mezzanine cards 264a and 264b (collectively, "264"), respectively. In this example, interconnections 262b and 262c are PCIe x16 links. Mezzanine cards 264 (e.g., network adapters 116 of FIG. 1) can provide connections to access devices (e.g., port extenders 114 of FIG. 1). Local storage controller 266 (e.g., an embedded 6G SAS RAID controller connects to I/O hub 256 through a PCIe x4 link.

ICH 268 also connects to I/O hub 256 by interconnection 270 (e.g., an Enhanced Function Interface (EFI) bus). ICH 268 provides connections to BMC 272, Front panel 274, and boot subsystem 276. Front panel 274 can include one or more USB ports and/or ports for other low-speed peripheral devices (not shown). One of ordinary skill in the art will appreciate that computing system 200 is in many respects similar to computing system 250. However, computing system 250 is a full-slot server that includes more overall resources than computing system 200, a half-slot server. For example, computing system 250 includes more sockets and cores than computing system 200, and thus the CPU of computing system 250 includes more processors than the CPU of computing system 200, more DIMMs and thus more main memory, and more I/O interfaces (including mezzanine cards). Thus, computing system 250 has greater processing power, memory, and networking capabilities than computing system 200. Although computing systems 200 and 250 illustrate examples of the x86 architecture, other embodiments may utilize other server architectures (e.g., ARM, MIPS, Power, SPARC, other Reduced Instruction Set Computer (RISC) architectures, and/or other Complex Instruction Set Computer (CISC) architectures), and one of ordinary skill in the art could readily apply the principles disclosed in this disclosure to these other architectures.

Figure 3:
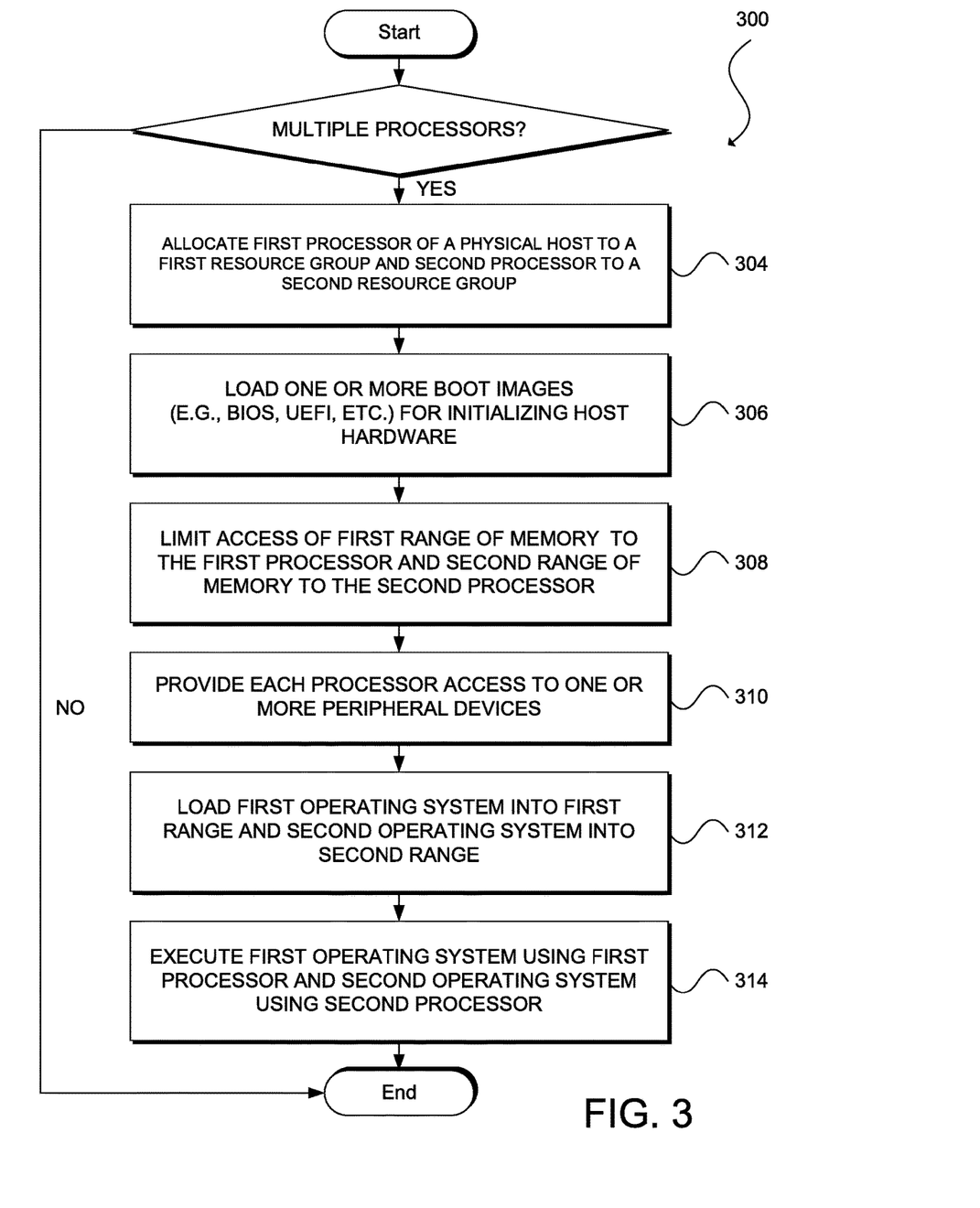
FIG. 3 illustrates an example of a process for physically partitioning resources of a computing system via a baseboard management controller of the system in accordance with an embodiment.

FIG. 3 illustrates an example of process 300 for physically partitioning resources of a computing system via a baseboard management controller of the system. One of ordinary skill will understood that, for any method discussed herein, there can be additional, fewer, or alternative steps performed in similar or alternative orders, or in parallel, within the scope of the various embodiments unless otherwise stated. In some embodiments, a network, and particularly a network-wide manager (e.g., network-wide manager N of FIG. 1) or other system for monitoring and managing multiple servers, the network fabric, and/or server storage can communicate with a baseboard management controller to perform process 300. In other embodiments, a standalone baseboard management controller can perform process 300. Process 300 may begin with a physical server or host powering on and plugging into a network (e.g., from an off state, after reset, after plug-in into a chassis/rack, after insertion as a card into a slot, etc.).

At step 302, a baseboard management controller (BMC) (e.g., BMC 118a or 118b) can determine the availability of multiple processors of the host of the BMC for provisioning to an end user. A processor may include a single-socket central processing unit (CPU), a pair of CPUs or processors of a four-socket server, a multi-core processor, a single core of a multi-core processor, or other discrete physical device capable of executing the instructions of a computer program by performing the basic arithmetic, logical, control, and input/output (I/O) operations specified by the instructions. If there are no processors available, process 300 can come to an end. Otherwise, process 300 can continue onto step 304 at which the BMC can allocate at least a first processor of the physical host to a first resource group and a second processor of the physical host to a second resource group.

Proceeding to step 306, the BMC can load one or more boot images (e.g., BIOS, UEFI boot manager, boot loader, bootstrap, etc.) and/or other configuration data from a SAN (e.g., SAN 102a or 102b of FIG. 1) or other remote source or a storage device embedded on the physical host (e.g., ROM, flash memory, or other non-volatile memory) (e.g., boot subsystem 128a or 128b, boot subsystem 220 of FIG. 2A, or boot subsystem 276 of FIG. 2B) for initializing the hardware of the physical host. In some embodiments, the BMC can receive a single boot image for configuring multiple physical partitions of the host. In other embodiments, the BMC may receive multiple boot images, including at least one unique boot image for each different resource group. In this manner, each resource group can boot-up independently from one another and apply different programmable code-signing keys for giving the BMC control over which operating system each resource group may load.

After loading the boot image(s), at step 308 the BMC/boot image(s) can partition the main memory (i.e., primary storage, internal memory, RAM, etc.) of the physical host into at least a first memory range for exclusive use by the first processor and a second memory range for exclusive use by the second processor. For example, the first memory range can comprise a first set of DIMMs and the second memory range can comprise a second set of DIMMs. The BMC/boot image(s) can generate a first memory map that maps the first memory range to the first set of DIMMs and excludes mappings to other DIMMs. The BMC/boot image(s) can also generate a second memory map that maps the second memory range to the second set of DIMMs and excludes mappings to other DIMMs, including the first set of DIMMs. The BMC/boot image(s) can allocate the resources of the computing system in a variety of configurations.

Figure 4A:
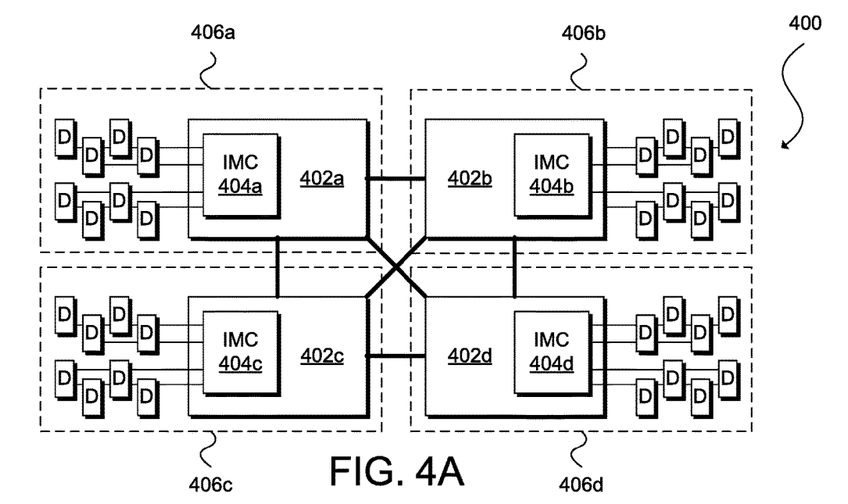
FIG. 4A, FIG. 4B, and FIG. 4C illustrate examples of physically partitioned computing systems in accordance with some embodiments.
Figure 4B:
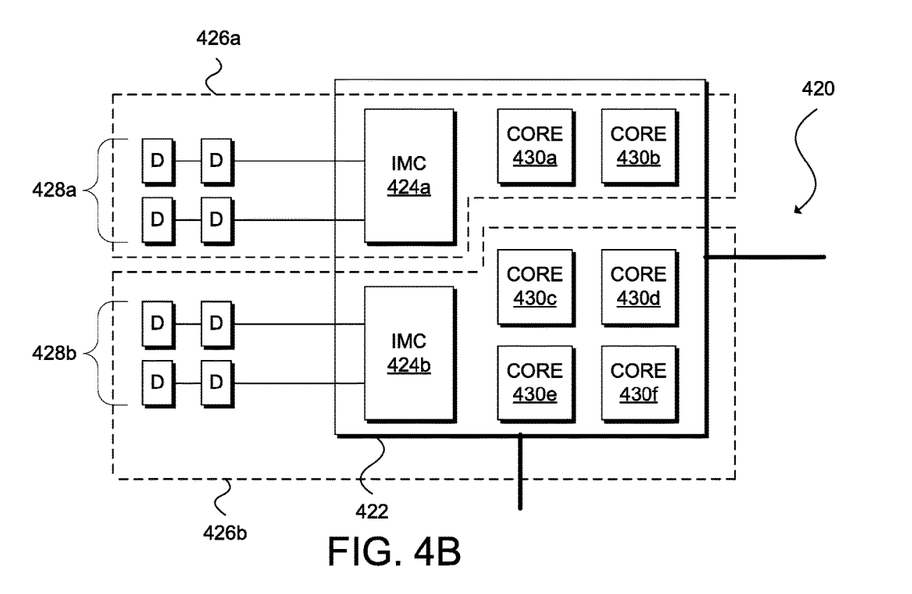

FIG. 4A, FIG. 4B, and FIG. 4C illustrate different ways that a BMC can physically partition the processors and main memory of a computing system. In particular, FIG. 4A illustrates a computing system 400 having four sockets for four CPUs 402a, 402b, 402c, and 402d (collectively, "402"). Each processor 402 includes integrated memory controller (IMC) 404 for accessing a respective set of DDR3 DIMMs D. In this example, a BMC (not shown) partitions computing system 400 into resource groups 406a, 406b, 406c, and 406d (collectively, "406"). Each resource group (e.g., resource group 406a) includes a subset of the processing resources of computing system 400 (e.g., processor 402a); a subset of the memory controllers of computing system 400 (e.g., IMC 404a); and a subset of memory or a range of the main memory of computing system 400 (e.g., DIMMs D directly connected to IMC 404a). Although FIG. 4A shows that each resource group 406 includes one CPU, a resource group can also include multiple CPUs. For example, in an embodiment, the BMC can partition computing system into three resource groups, a first resource group including CPUs 402a and 402b, a second resource group including CPU 402c, and a third resource group including CPU 424c. A resource group can also include a portion of a CPU (i.e., one or more cores of a multi-core processor) as shown in FIG. 4B and discussed further below.

In some embodiments, computing system 400 can implement cache coherency by default and disable cache coherency under certain conditions (or vice versa, i.e., disable cache coherency by default and activate cache coherency under certain conditions). A computing system that implements cache coherency seeks uniformity of shared data stored among multiple local caches. Common approaches for achieving cache coherency include snooping and directory-based cache coherency. In snooping, individual caches monitor address lines for access to cached memory locations and invalidate or update a copy of a snooped memory location on write to the corresponding memory location in a different cache. In directory-based cache coherency, each processor stores shared data to a common directory that maintains the coherency between caches. When an entry in the directory changes, the directory either updates or invalidates the other caches. In the example of FIG. 4A, actively maintaining cache coherency is unnecessary because of the isolation between processors 402 and their respective ranges of main memory. Thus, computing system 400 may safely disable cache coherency for improved performance by each resource group.

FIG. 4B illustrates computing system 420 including CPU 422 and DIMMs 428a and 428b (collectively, "428"). CPU 422 includes six cores, processors 430a, 430b, 430c, 430d, 430e, and 430f (collectively, "430"), and IMCs 424a and 424b (collectively, "424"). Computing system 420 may be a single-socket server including only CPU 422 or a multi-socket server including CPU 422 and one or more other CPUs. In this example, a BMC (not shown) separates computing system 420 into at least two resource groups 426a and 426b (collectively, "426"). Resource group 426a includes cores 430a and 430b, IMC 424a, and DIMMs 428a. Resource group 426b includes cores 430c, 430d, 430e, and 430f, IMC 424b, and DIMMs 428b.

As shown in FIG. 4B, the BMC of computing system 420 is capable of partitioning the cores of a multi-core processor into two or more resource groups with at least one core in a first resource group and a second core in a second resource group. That is, the BMC can limit the memory accessible by cores 430a and 430b to DIMMs 428a; and the BMC can limit the memory accessible by cores 430c, 430d, 430e, and 430f to DIMMs 428b. In other embodiments, the BMC can address memory differently for each individual core. For example, in an embodiment, CPU 422 may include additional pins for encoding which core 430 is requesting a cache line in order to limit a particular core to a particular range of memory. A person of ordinary skill in the art will understand that other embodiments may utilize other techniques for addressing memory differently for each core of a multi-core processor.

FIG. 4B also shows that the BMC is capable of allocating IMCs 424a and 424b among different resource groups. IMCs 424a and 424b may be physically or logically separate elements each associated with a memory map to DIMMs 428a and 428b, respectively. In some embodiments, computing system 420 may disable cache coherency at least between DIMMs 428a and 428b because of the physical isolation between these memories and their respective processors.

In some embodiments, a resource group may also be associated with various priority levels. The BMC may configure whether one core may interrupt another core residing in the same socket or whether one CPU may interrupt another CPU mounted on the same motherboard based on priority level.

Figure 4C:
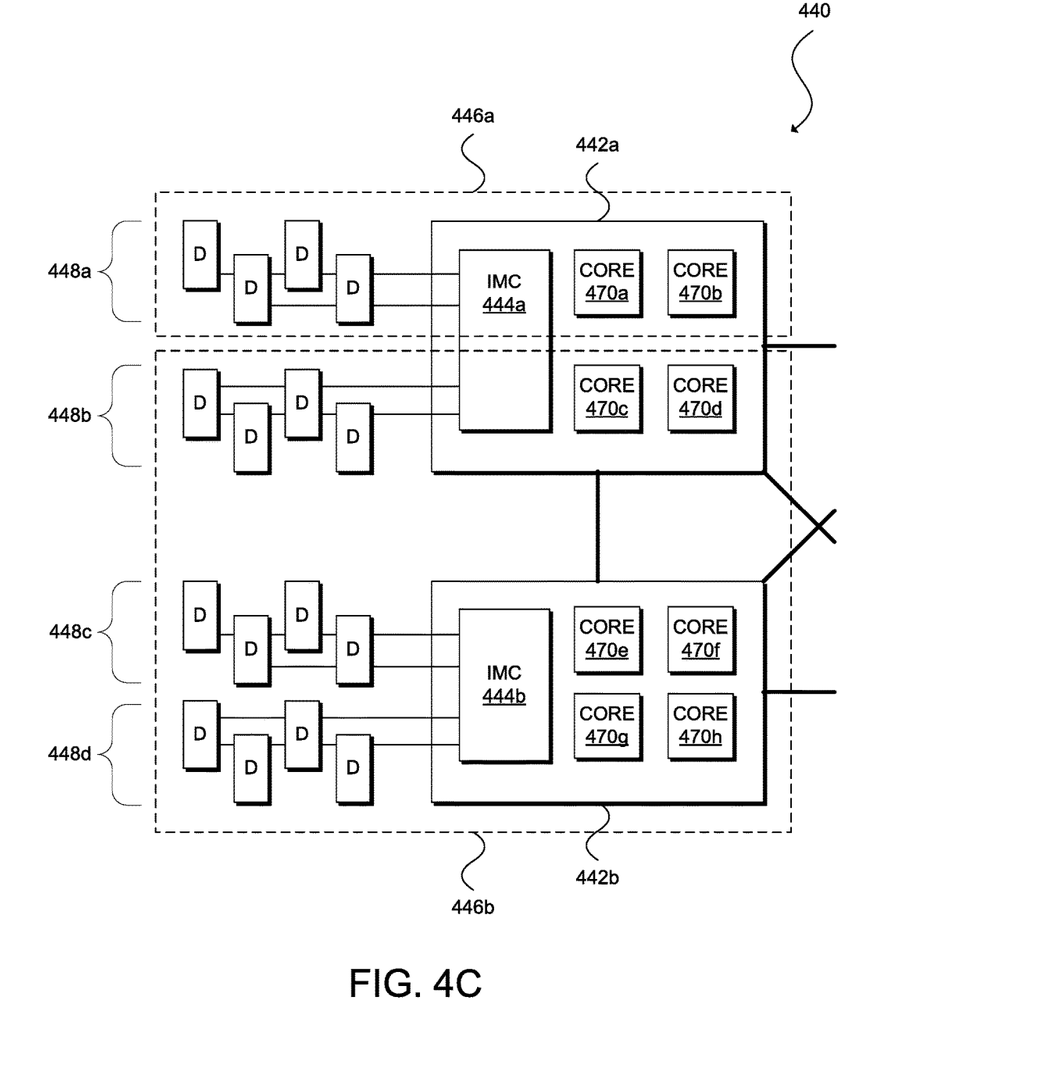

FIG. 4C illustrates computing system 440 including at least CPUs 442a and 442b (collectively, "442") and DIMMs 448a, 448b, 448c, and 448d (collectively, "448"). CPU 442a includes four cores, processors 470a, 470b, 470c, and 470d and IMC 444a. CPU 442b also includes four cores, processors 470e, 470f, 470g, and 470h and IMC 444b. Although CPUs 442 include the same number of cores in this example, other embodiments may include multi-core multi-processors having different numbers of cores (e.g., 2 and 4 cores, 4 and 6 cores, 2 and 6 cores, etc.). In this example, a BMC (not shown) partitions computing system 440 into at least two resource groups 446a and 446b (collectively, "446"). Resource group 446a includes cores 470a and 470b, IMC 444a, and DIMMs 448a. Resource group 446b includes cores 470c, 470d, 470e, 470f, 470g, and 470h, IMCs 444a and 444b, and DIMMs 448b, 448c, and 448d. In some embodiments, the BMC may logically partition IMC 444a into two virtual memory controllers with one virtual controller dedicated to resource group 446a and another virtual controller dedicated to resource group 446b.

As shown in FIG. 4C, the BMC of computing system 440 can define a resource group including portions of CPUs 442a and 442b (i.e., at least one core from CPU 442a and one core from CPU 442*b*). In some embodiments, it may also be possible to logically partition IMCs 444 into multiple virtual memory controllers to limit the access of each processor 442 to a specific memory range or set of DIMMs 448. In this example, computing system 440 may disable cache coherency at least between DIMM 428*a* and other DIMMs because of the physical isolation between these memories and their respective processors but maintain cache coherency at least between and among DIMMs 448*b*, 448*c*, and 448*d*.

Returning to FIG. 3, process 300 can continue to step 310 in which the BMC/boot image(s) can distribute access to physical or virtual peripheral devices connected to the physical host between and among the first processor and the second processor. The peripheral devices can include network adapters, graphic processing unit (GPU) adapters, Peripheral Component Interconnect Express (PCIe) Flash adapters, Fibre Channel host bus adapters (HBAs), disks, disk controllers, USB devices, etc. In some embodiments, the BMC/boot image(s) can expose one or more PCIe I/O ports to one of the processors and/or hide one or more other PCIe I/O ports from that processor. In some embodiments, the BMC/boot image(s) can map one or more peripheral device's memories into one of the processors' main memory range to give that processor access to the peripheral device(s) and/or deny that processor access to one or more other peripheral devices by not mapping the other peripheral devices' memories into the processor's main memory. In some embodiments, the BMC/boot image(s) can configure a peripheral device to be a bus master, and that peripheral device can act on I/O requests from one of the processors and ignore I/O requests from another processor. In some embodiments, the BMC/boot image(s) may utilize Single Root I/O Virtualization (SR-IOV) to virtualize a physical peripheral device to create multiple virtual peripheral devices accessible by multiple operating systems and their respective processors on a single-socket server. In some embodiments, the BMC/boot image(s) may utilize Multi-Root I/O Virtualization (MR-IOV) to virtualize a physical peripheral device to create multiple virtual peripheral devices accessible by multiple operating systems and their respective processors on a multi-socket server.

At step 312, the BMC/boot image(s) can load a first operating system into the first range of main memory associated with the first processor and a second operating system into the second range of main memory associated with the second processor. The operating systems may be different operating systems (e.g., Microsoft Windows, UNIX, Linux, Mac OS X, etc.) or different versions of the same operating system (e.g., Microsoft Windows 7.0 and Microsoft Windows 10.0). As discussed elsewhere herein, the BMC/boot image(s) can retrieve or otherwise receive the operating systems from a SAN or other remote storage or a local mass storage device (e.g., HDD, SDD, flash drive, etc.). Process 300 may conclude at step 314 when the BMC cedes control to the first processor to execute the first operating system and to the second processor to execute the second operating system.

For clarity of explanation, in some instances the disclosure may present various embodiments as including individual functional blocks comprising devices, device components, steps or routines in a method embodied in software or firmware, or combinations of hardware, firmware, and/or software.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Computer-executable instructions, stored or otherwise available from computer readable media, can implement methods according to the above-described examples. Such instructions can comprise, for instance, instructions and data which cause or otherwise configure a general purpose computer, special purpose computer, or special purpose processing device to perform a certain function or group of functions. Portions of computer resources used can be accessible over a network. The computer-executable instructions may also include binaries, intermediate format instructions such as assembly language, firmware, or source code. Examples of computer-readable media for storing instructions, information used, and/or information created during methods according to described examples include magnetic or optical disks, flash memory, USB devices provided with non-volatile memory, networked storage devices, and so on.

Devices implementing methods according to these disclosures can comprise hardware, firmware, and/or software, and can take any of a variety of form factors. Typical examples of such form factors include servers (e.g., mainframe servers, tower servers, rack-mount servers, blade servers, microservers, etc.), small form factor personal computers, laptops, smart phones, personal digital assistants, and so on. Peripherals or add-in cards can also perform some of the functionality described herein. A circuit board including different chips or different processes executing in a single device can also perform some of the functionality, by way of further example.

The instructions, media for conveying such instructions, computing resources for executing them, and other structures for supporting such computing resources are means for providing the functions described in these disclosures.

Although a variety of examples and other information explain aspects within the scope of the appended claims, no limitation of the claims are implicit based on particular features or arrangements in such examples as one of ordinary skill would be able to use these examples to derive a wide variety of implementations. Further and although the disclosure may describe some subject matter in language specific to examples of structural features and/or method steps, a person having ordinary skill in the art will understand that the subject matter defined in the appended claims is not necessarily limited to these described features or acts. For example, such functionality can be distributed differently or performed in components other than those identified herein. Rather, the described features and steps disclosed are examples of components of systems and methods within the scope of the appended claims.

The invention claimed is:

1. A computer-implemented method, comprising:
   determining, by a baseboard management controller of a physical host, that the physical host includes at least a first processor and a second processor;
   configuring, by the baseboard management controller, one or more first memory controllers to provide access of the first processor to a first range of memory of the physical host, the first processor denied access to other ranges of memory of the physical host including a second range of memory of the physical host by one or more second memory controllers;
   limiting access of the second processor to the second range of memory of the physical host;

loading a first operating system within the first range of memory and a second operating system in the second range of memory;

executing, by the first processor, the first operating system within the first range of memory; and executing, by the second processor, the second operating system within the second range of memory.

2. The computer-implemented method of claim 1, wherein the one or more first memory controllers are configured to control the first range of memory.

3. The computer-implemented method of claim 2, further comprising:

configuring the one or more second memory controllers to deny the access of the first processor to the other ranges of memory of the physical host, the one or more second memory controllers not having control over the first range of memory.

4. The computer-implemented method of claim 1, further comprising:

generating a memory map that maps the first range of memory to a first set of dual inline memory modules (DIMMs) of the physical host and that excludes mappings to other DIMMs of the physical host.

5. The computer-implemented method of claim 1, further comprising:

disabling cache coherency between the first range of memory and the second range of memory.

6. The computer-implemented method of claim 1, further comprising:

receiving at least a first boot image including first instructions for loading the first operating system and a second boot image including second instructions for loading the second operating system;

loading the first boot image into the first range of memory and the second boot image into the second range of memory;

executing, by the first processor, the first instructions for loading the first operating system; and executing, by the second processor, the second instructions for loading the second operating system.

7. The computer-implemented method of claim 1, further comprising:

providing, by the baseboard management controller, access to the first processor to an input/output (I/O) port of the physical host by exposing the I/O port to the first processor.

8. The computer-implemented method of claim 1, further comprising:

denying, by the baseboard management controller, access to the first processor to an I/O port of the physical host by hiding the I/O port from the first processor.

9. The computer-implemented method of claim 1, further comprising:

mapping, by the baseboard management controller, memory of a peripheral device to the first range of memory to provide access to the first processor to the peripheral device.

10. The computer-implemented method of claim 1, further comprising:

denying, by the baseboard management controller, access to a peripheral device connected to the physical host by excluding a mapping of memory of the peripheral device to the first range of memory.

11. The computer-implemented method of claim 1, further comprising:

sending, by the first processor, an I/O request to a peripheral device connected to the physical host; and receiving, by the first processor, an I/O response from the peripheral device.

12. The computer-implemented method of claim 1, further comprising:

sending, by the first processor, an I/O request to a peripheral device connected to the physical host; and ignoring, by the peripheral device, the I/O request.

13. A server comprising:

a processing subsystem;

a memory subsystem; and a baseband management controller including:

a baseband processor; and baseboard memory including instructions that, upon execution by the baseband processor, cause the server to:

determine the processing subsystem includes one or more first processors and one or more second processors;

configure one or more first memory controllers to provide access of the one or more first processors to a first range of the memory subsystem, the one or more first processors denied access to other ranges of the memory subsystem including a second range of the memory subsystem by one or more second memory controllers;

limit access of the one or more second processors to the second range of the memory subsystem;

load a first operating system within the first range of the memory subsystem and a second operating system within the second range of the memory subsystem; and cause the one or more first processors to execute the first operating system within the first range of the memory subsystem and the one or more second processors to execute the second operating system within the second range of the memory subsystem.

14. The server of claim 13, wherein, the one or more first processors include a first central processing unit (CPU), and the one or more second processors include a second CPU.

15. The server of claim 13, wherein, the one or more first processors include a first core of a multi-core processor, and the one or more second processors include a second core of the multi-core processor.

16. The server of claim 13, wherein, the one or more first processors include a first core of a first multi-core processor, and the one or more second processors include a second core of a second multi-core processor.

17. A non-transitory computer-readable medium having instructions that, upon execution by a processor of baseboard management controller (BMC) of a physical host, cause the BMC to:

allocate one or more first processors of the physical host to a first resource group;

allocate one or more second processors of the physical host to a second resource group;

configure one or more first memory controllers to provide access of the one or more first processors to a first range of memory of the physical host, the one or more processors denied access to other ranges of memory of the physical host including a second range of memory of the physical host by one or more second memory controllers;

limit access of the one or more second processors to the second range of memory of the physical host;

load a first operating system within the first range of memory; load a second operating system within the second range of memory;

cause the one or more first processors to execute the first operating system within the first range of memory; and cause the one or more second processors to execute the second operating system within the second range of memory.

18. The non-transitory computer-readable medium of claim 17, wherein the instructions upon execution further cause the BMC to:

virtualize a physical memory controller of the physical host to create a first virtual memory controller and a second virtual memory controller;

allocate the first virtual memory controller to the first resource group; and allocate the second virtual memory controller to the second resource group.

19. The non-transitory computer-readable medium of claim 17, wherein the physical host is a single-socket server, and wherein the instructions upon execution further cause the BMC to:

virtualize a physical peripheral device using Single Root I/O Virtualization to create at least a first virtual peripheral device and a second virtual peripheral device;

allocate the first virtual peripheral device to the first resource group; and allocate the second virtual peripheral device to the second resource group.

20. The non-transitory computer-readable medium of claim 17, wherein the physical host is a multi-socket server, and wherein the instructions upon execution further cause the BMC to:

virtualize a physical peripheral device using Multi I/O Virtualization to create at least a first virtual peripheral device and a second virtual peripheral device;

allocate the first virtual peripheral device to the first resource group; and allocate the second virtual peripheral device to the second resource group.

* * * * *